Figure 1:
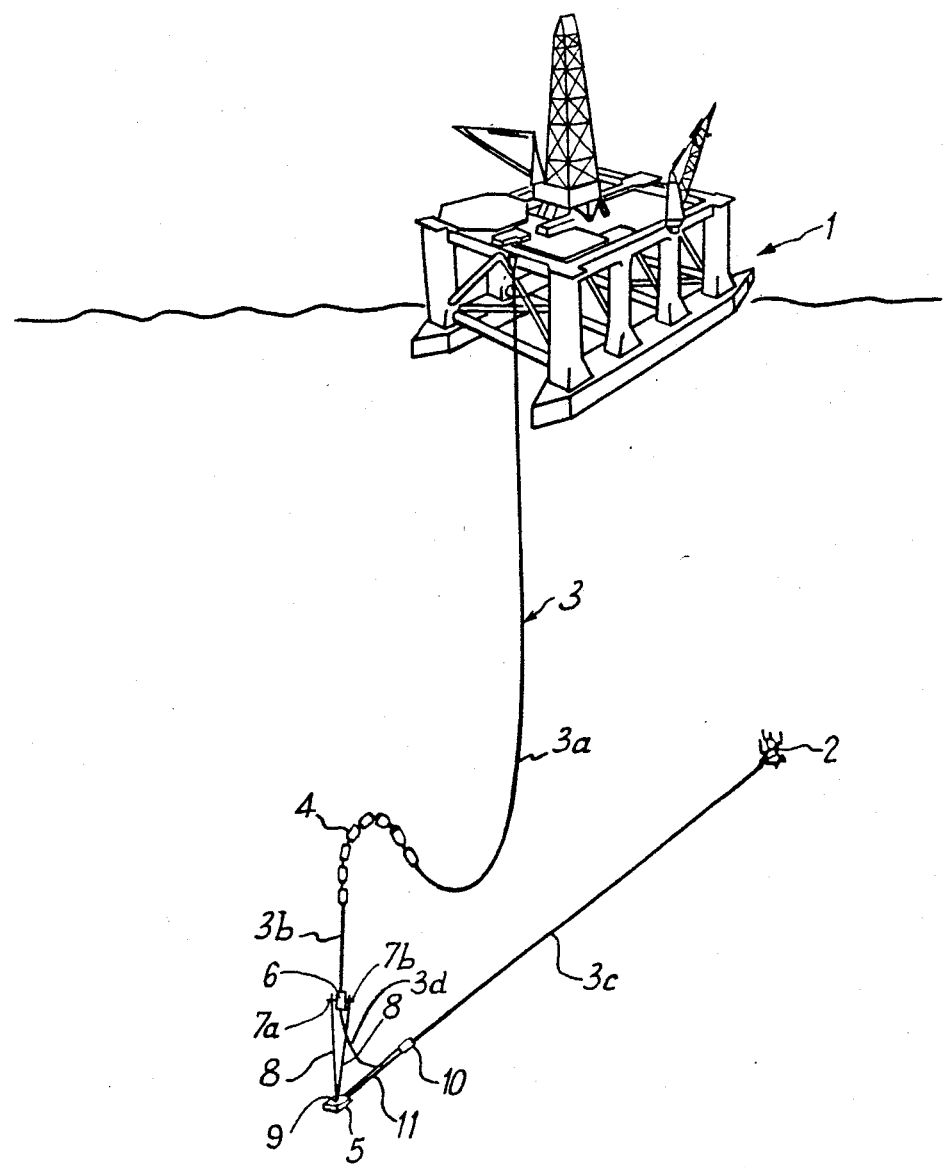

United States Patent [19]

Maloberti et al.

[11] Patent Number: 4,906,137
[45] Date of Patent: Mar. 6, 1990

[54] APPARATUS FOR TRANSFERRING FLUID BETWEEN SUBSEA FLOOR AND THE SURFACE

[75] Inventors: René Maloberti, Nogent-sur-Marne; Patrick Narzul, La Celle Saint Cloud, both of France

[73] Assignee: COFLEXIP, Paris, France

[21] Appl. No.: 313,785

[22] Filed: Feb. 23, 1989

[30] Foreign Application Priority Data

Feb. 24, 1988 [FR] France .................. 88 02238

[51] Int. Cl.⁴ .......................................... E21B 43/013
[52] U.S. Cl. ..................................... 405/195; 166/338; 405/169; 405/170
[58] Field of Search ............... 405/195, 202, 169, 170, 405/171; 166/338, 340, 341, 339

[56] References Cited

U.S. PATENT DOCUMENTS

| | | |
|---|---|---|
| 3,204,708 | 9/1965 | Berne . |
| 3,650,114 | 3/1972 | Neal . |
| 4,400,110 | 8/1983 | Beynet et al. . |
| 4,423,984 | 1/1984 | Panicker et al. .................... 405/195 |
| 4,459,066 | 7/1984 | Van der Graaf ............... 405/202 X |
| 4,730,677 | 3/1988 | Pearce et al. .................. 405/195 X |

FOREIGN PATENT DOCUMENTS

| | | |
|---|---|---|
| 0145214 | 6/1985 | European Pat. Off. . |
| 0251488 | 5/1987 | European Pat. Off. . |
| 821629 | 11/1951 | Fed. Rep. of Germany . |
| 8111790 | 12/1982 | France . |

Primary Examiner—Dennis L. Taylor
Attorney, Agent, or Firm—Charles W. Fallow; Martin P. Hoffman

[57] ABSTRACT

A lower portion of a subsea oil delivery hose is held taut between bouyant devices installed on the hose and a stationary point on the subsea floor. A portion of the lower part of the hose, connected to the stationary point, has a curved portion that is concave in the direction of a wellhead to which the hose is connected.

10 Claims, 4 Drawing Sheets

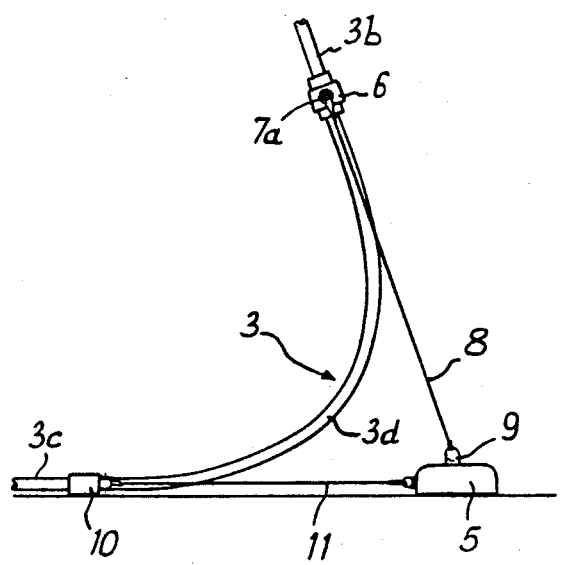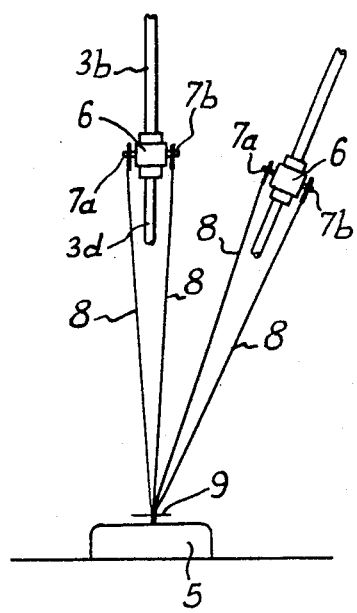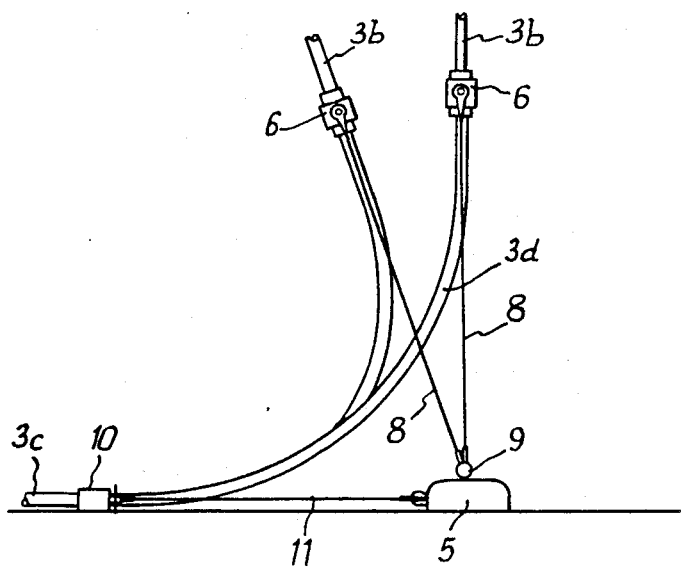

APPARATUS FOR TRANSFERRING FLUID BETWEEN SUBSEA FLOOR AND THE SURFACE

This invention relates to a device for transfer of fluid between the subsea floor and the surface and particularly a device for the gathering and lifting of oil produced by a subsea deposit, and more specifically such a device using at least one hose.

The applicant company has for many years manufactured and marketed, in great lengths, high-performance hoses used to equip subsea oil fields, particularly for the gathering and lifting of oil from wellheads or other structures, such as connecting elements (manifolds), located on the subsea floor up to a surface support such as a production platform—for example floating, semi-submersible or rigged up—or a ship.

Various configurations have been proposed and used for these hoses between the subsea floor, particularly the wellhead, and the subsurface support.

These various configurations have been described in a document entitled "Flexible riser system for floating production application in the North Sea" by MAHONEY and BOUVARD (OTC Document 5163) giving an account of a lecture presented at the 18th "Offshore Technology Conference" in Houston, Tex. from 5 to 8 May 1986, and more recently in a document entitled "Recommended Practice for Design and Operation of Subsea Production System" (API Recommended Practice 17A) 1st edition, Sept. 1, 1987 published by the American Petroleum Institute.

Thus, for such devices for production and lifting of oil, configurations are used that are illustrated on page 67 of the API document and known under the name of "LAZY S" or "LAZY WAVE" and "STEEP S" or "STEEP WAVE," respectively.

In these configurations, the hoses extend in a catenary between the surface support and an intermediate positive buoyancy element able to impart to the hose, over a portion of its length, a curved configuration of concavity turned toward the floor.

The intermediate element can be an arch of concavity turned toward the subsea floor, if necessary connected to the subsea floor by tie rods, a group of positive buoyancy elements (buoys) placed in succession and fastened to the hose, or else as described in "OFFSHORE ENGINEER" of February 1985 on page 31, and in EP-A-0251488, a buoyancy chamber connected by tie rods to the subsea floor. In this last configuration, the concavity of the hose below the buoy is directed toward the wellhead or the structure located on the floor and from which the oil must be lifted.

In the "LAZY S" or "LAZY WAVE" configuration, the portion of the hose below the intermediate element exhibits a catenary-shaped configuration to the level of the subsea floor, the hose then extending on the subsea floor to a wellhead or to a connecting element located on the floor.

Such a configuration, particularly in the most frequent case where the surface support is vertically from the wellhead, increases the length of hose necessary between the wellhead and the surface support and especially exhibits a considerable bulk at the level of the subsea floor that can lead to inextricable problems in the case of a large number of hoses or of bundles of hoses.

In the "STEEP S" or "STEEP WAVE" configuration, the portion of the hose between the intermediate element and the subsea floor is stretched, the lower end of the hose being fastened to a base resting on the floor.

The simplified diagram of this base is illustrated in FIG. 9 of the OTC document mentioned above.

In this type of configuration, it is necessary to connect each of the lifting hoses to the previously installed base and to connect the hose or hoses coming from the wellhead to this base (cf. FIG. 11 of the OTC document).

This solution requires the construction and positioning of heavy bases with large dimensions equipped with connection systems. In addition, in the prior configurations, the connection operations had to be performed by divers, which necessarily complicates the positioning and limits the depths of use, without using special, remote-controlled connecting equipment that is costly, complex and not readily available, such as for example the equipment described in EP-A-0251488.

This invention proposes to provide a device avoiding both the drawbacks of the "LAZY S" or "LAZY WAVE" configuration and those of the "STEEP S" or "STEEP WAVE" configurations and this, by particularly simple and economic means, particularly during installation, while making a continuous connection between the wellhead and the surface support, (with the exception, if applicable, of simple connectors in the length of the hose) the entire hose being approximately in the same vertical plane.

The device according to the invention is close to the "STEEP S" or "STEEP WAVE" type in the sense that a part of the hose below the intermediate element is held taut by being connected to a stationary point on the subsea floor and is characterized essentially by the fact that it comprises holding means for at least one zone of said lower part of the hose, connected to said stationary point and made to hold taut the part of the hose located between the intermediate element and the holding means and to impart to the hose in a vertical plane, a predetermined necessary curvature whose concavity is directed in the direction of the wellhead or the structure located on the floor and from which the oil must be lifted.

In a preferred embodiment, said holding means comprise at least one collar placed around the hose, between the intermediate element and the floor, said collar —intended to take up the pull of the hose—being connected by at least one anchoring tie rod to the stationary point, made preferably in the form of a deadman placed on the subsea floor. Preferably, two stationary tie rods are provided approximately at the same point on the deadman, spreading out upward from the latter and each connected to one of the two projecting aligned pin elements of said collar. This arrangement exhibits the advantage of preventing any pulls diverted to the hose at the level of the collar in case of a movement of the hose outside a vertical plane, particularly under the effect of cross currents.

Preferably, the pin elements are mounted on an outside annular part surrounding a central part of the collar assuring the clamping of the hose and the absorption of tension, said outside annular part being mounted around said central part in a position of predetermined orientation.

In this embodiment, it is advantageous also to position on the hose, in its horizontal part, at the level of the subsea floor, at least a second collar connected also by one or more tie rods to the deadman.

It must be understood that the deadman according to the invention is very different from the base provided in the "STEEP S" or "STEEP WAVE" configurations to the extent that it exhibits slight dimensions, is easy to make and to submerge, and does not comprise any hose connection means, the hose according to the invention being completely continuous between the wellhead and the surface support.

Other holding means can be provided according to the invention, such as for example articulated vertebrae extending from the deadman over a part of the length of the lower part of the hose, the hose then being fastened to the deadman. In another embodiment, these holding means can consist of a neck solid with the deadman performing a holding and a guiding, in a vertical plane, of the corresponding part of the hose.

To better understand the invention, it will now be described with reference to the accompanying drawing of the examples of embodiment that are in no way limiting.

Figure 5:
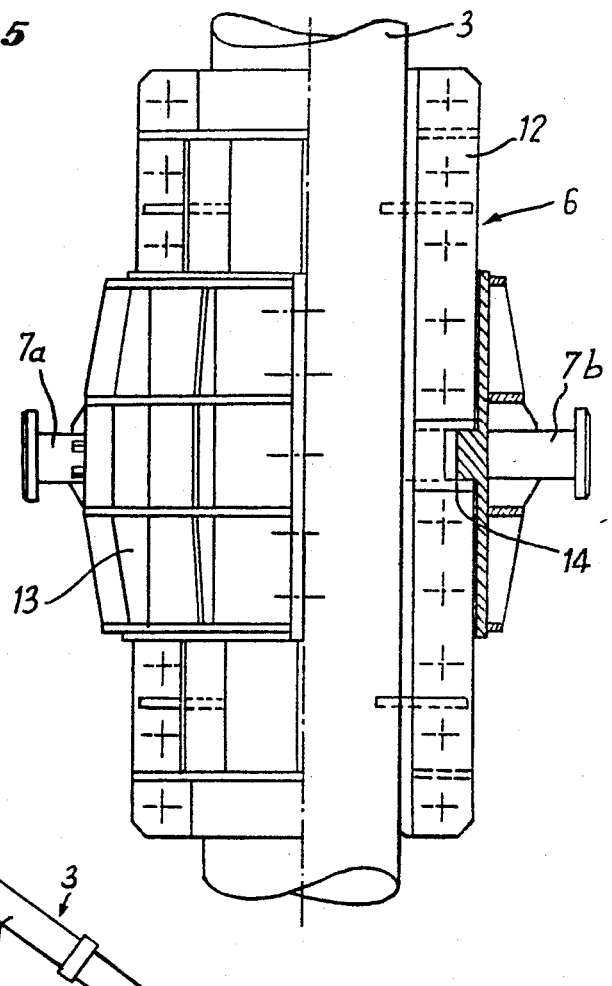
Figure 7:
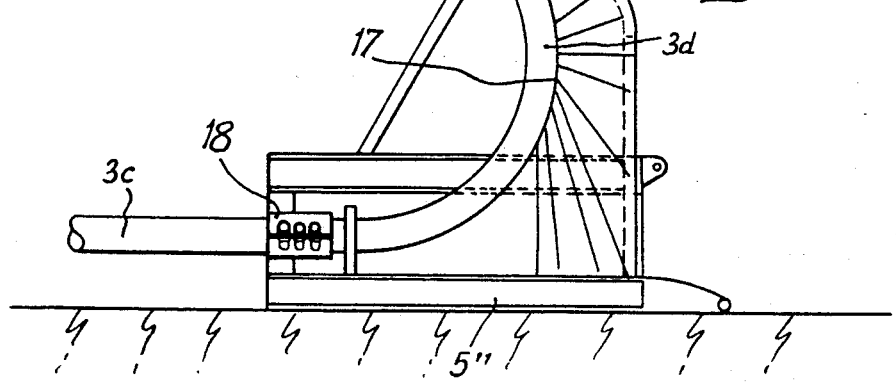

FIG. 1 is a diagrammatic view illustrating a first mode of using the device according to the invention, FIG. 2 is a partial view in lateral elevation of the device illustrated in FIG. 1, FIG. 3 is a back view corresponding to FIG. 2 illustrating two positions of the hose, FIG. 4 is a view similar to FIG. 2 illustrating the end positions of the corresponding part of the hose, FIG. 5 is a view in elevation, in half-section of an embodiment of the collar of the embodiment of FIGS. 1 to 4, FIG. 6 is a diagrammatic partial view in lateral elevation of a second mode of use, and FIG. 7 is a diagrammatic partial view in lateral elevation of a third mode of use.

Reference is first made to FIGS. 1 to 4.

The device according to the invention extends between a surface support 1 represented here in the form of a semi-submersible production platform and a wellhead 2 located on the subsea floor approximately vertically from platform 1.

To illustrate the invention, the device has been represented in the form of a single hose 3 for the lifting of oil, but it should be well understood that in practice, on an oil field, a large number of these hoses are provided arranged in bundles.

The configuration illustrated in FIG. 1 for hose 3 resembles the "STEEP WAVE" type in the sense that at a point located between the floor and the surface, around the hose, there is provided an intermediate element 4 in the form of a group of positive buoyancy elements (buoys), placed in succession and imparting to hose 3, over a part of its length, a curved configuration with concavity turned toward the floor. The element 4 represented could be replaced by an arch, as illustrated in FIG. 4 of the OTC document mentioned above, or by a buoy fastened to the floor by tie rods as in EP-A-0251488.

Hose part 3a between the zone defined by intermediate element 4 and surface support 1, exhibits a catenary configuration, while hose part 3b below element 4 is made taut by being fastened to a deadman 5 placed on the subsea floor as will be described below.

As can be seen best in FIGS. 2 to 4, there is provided around the hose a collar 6 clamped around the hose, the collar comprising two opposite aligned pin elements 7a, 7b on each of which is fastened an anchoring guy or tie rod 8 connecting collar 6 to deadman 5. As can be seen particularly in FIG. 3, two anchoring tie rods 8 are provided fastened at a single point 9 to the upper part of deadman 5.

This embodiment makes it possible on the one hand to align the pull of the hose on the resultant of the pulls in the tie rods, and on the other hand, during a deflection of the hose (illustrated in FIG. 3) caused for example by cross currents, to preserve an axial alignment of the hose on both sides of clamping collar 6, thus preventing an axial offsetting which could, for example, be produced with two parallel anchoring tie rods.

For positioning the hose, there is provided in the example illustrated a second clamping collar 10 on horizontal part 3c of the hose between its point of contact with the subsea floor and the wellhead, collar 10 being connected by a tie rod 11 to deadman 5.

The arrangement according to the invention makes it possible, as can best be seen in FIG. 2, to impart to hose 3 in its part 3d located between collar 6 and the floor, a necessary curvature in a vertical plane and whose concavity, as can be seen in FIG. 1, is turned in the direction of the wellhead. Hose 3 is then completely continuous between its part 3b and its part 3c, without any bent intermediate section requiring successive connection operations as in the cases of the known "STEEP S" or "STEEP WAVE"-type configurations.

In the case where, for questions of hose length, for example, it is desired to provide a linking of partial lengths of hose by connectors, the two connected connectors can constitute the hose holding means in the sense of the invention and thus assure the function of collar 6 by being connected by tie rods to deadman 5.

The necessary radius of curvature is, of course, determined as a function of the diameter of the hose and of the conditions of use. It is understood that, according to the invention, because of the curved configuration of the hose in a vertical plane, the length of the hose between the floor and the surface is reduced to the minimum allowable and no section of hose is found forming useless loops on the subsea floor, as is the case in the "LAZY S" or "LAZY WAVE"-type configurations.

In the embodiment of FIG. 5, collar 6 can be oriented and comprises a central part 12 that forms a cylindrical sleeve around hose 3 and that assures a clamping effect so that the tension in hose 3 can be absorbed by collar 6, and an outside annular part 13 made to be able to be positioned in a groove 14 of part 12 surrounding hose 3. This arrangement makes it possible, during the installation of the device, to assure easily the orientation of the aligned pin elements 7a and 7b in a plane perpendicular to the plane in which hose 3 is inscribed.

The positioning of the device can be performed in a single operation, quickly and easily, without connection to be made to the floor (other than the possible one of horizontal part 3c of the hose to wellhead 2), without the intervention of divers and without having to use remote-controlled, automatic connection devices which are complex, costly, and not readily available. The operation does not require any servicing ship other than the ship used to lay the concerned hoses, and no special equipment other than that which is normally found on board such a ship. It is possible, for example, to lower deadman 5 at the same time as hose 3, with tie rods 8 and 11 in place connecting deadman 5 to collars 6 and 10, and thus to hold deadman 5 suspended by hose 3, and complete the operation by placing deadman 5 at the prescribed spot on the floor, its position being located from the surface by known means such as acoustic locating systems. In the case where collar 6 can be oriented, a remote-controlled underwater robot is used to verify and correct the orientation of pin elements 7a and 7b, and is equipped with a television camera and a small arm equipped with a gripper, and propulsion units and various other instruments. These robots, that are currently called R.0.V.'s and of which there are various known models, are available aboard ships used for the laying of hoses, being moreover necessary for various inspection tasks of the subsea installation.

Figure 6:
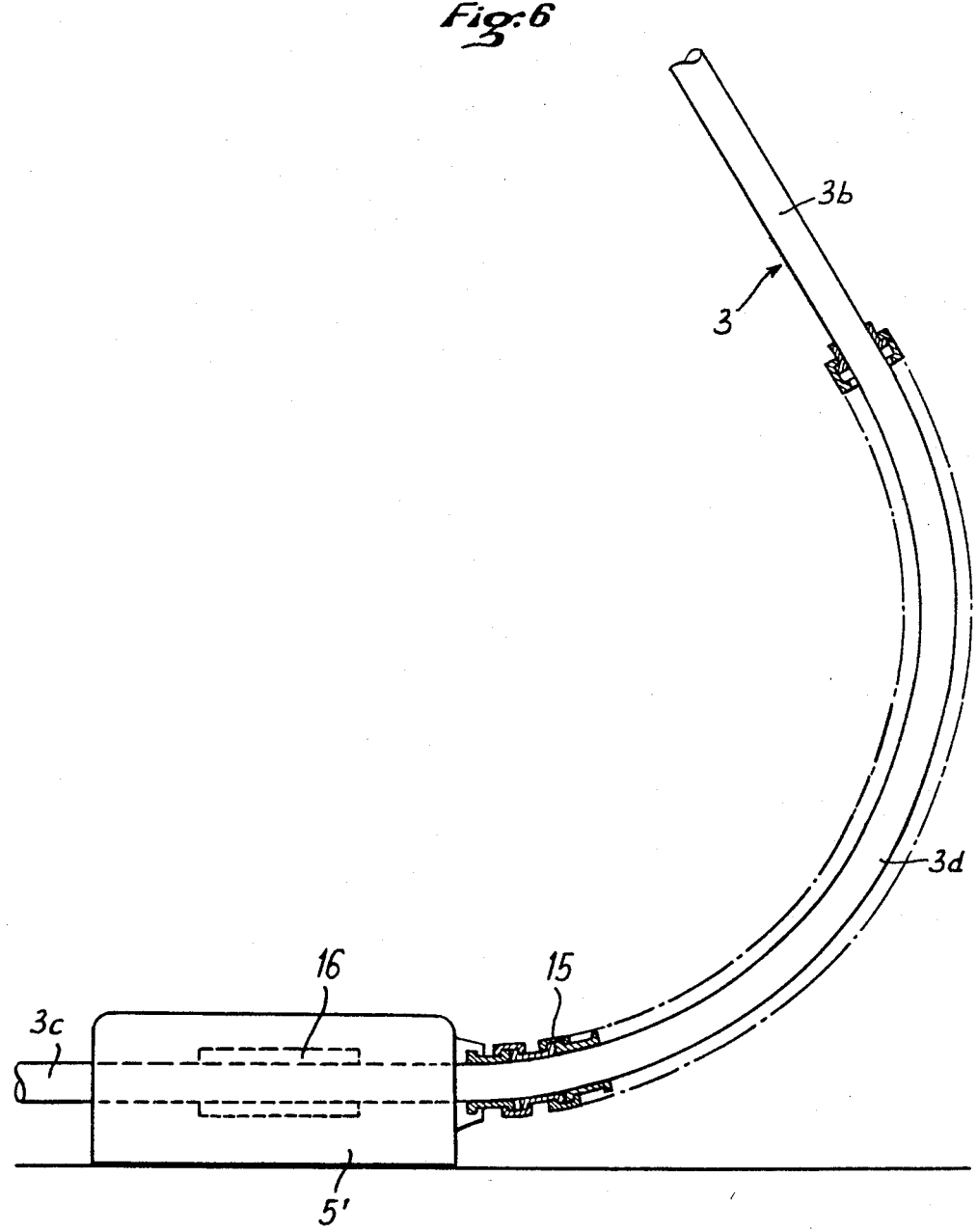

In the embodiment of FIG. 6, hose 3 passes through deadman 5' placed on the subsea floor, the curvature in the vertical plane being imparted by a set of articulated vertebrae 15 fitted at its lower end in deadman 5'. These vertebrae 15 are well known in offshore petroleum engineering to limit a radius of curvature and will not be described further in detail here. The hose is held in deadman 5' by a collar 16.

In the embodiment of FIG. 7, deadman 5" comprises an element 17 forming a neck for holding and guiding the hose, the neck being shaped to impart to hose 3 the desired, predetermined curvature in its vertical plane, hose 3 being held by a collar 18.

Although the invention has been described in connection with particular embodiments, it is quite obvious that it is in no way limited to them and that various variants and modifications can be made to it without thereby going outside its scope or its spirit.

We claim:

1. In a system for transferring fluid between a structure on the subsea floor and a support on the sea surface, particularly for the gathering and lifting of oil produced from a subsea deposit, including at least one hose extending in a catenary between the surface support and an intermediate element imparting to the hose, over a portion of its length, a curved configuration of concavity turned toward the floor, the improvement wherein a part of the hose between said intermediate element and the subsea structure is maintained in tension by being fastened to a stationary point on the sea floor, the system comprising an anchor at said stationary point, and connected thereto means for holding in tension a portion of the hose located between the intermediate element and the holding means, and to impart to the hose in the vicinity of the anchor, in a vertical plane, a curvature whose concavity is directed toward the subsea structure.

2. The invention of claim 1, wherein said holding means comprise at least one collar placed around the hose, at a position between the intermediate element and the floor, said collar being connected to said anchor by at least one anchoring guy.

3. The invention of claim 2, comprising two guys fastened approximately at the same point on the anchor, and spreading out upward therefrom, each guy being connected to a respective one of two projecting aligned pin elements on said collar.

4. The invention of claim 2, wherein the collar comprises an outside annular part surrounding a central part thereof, the central part assuring the clamping of hose and the absorption of its tension, said outside annular part being mounted around said central part in a predetermined orientation, and said pin elements being affixed to said outside annular part.

5. The invention of claim 2, further comprising, around a horizontal portion of said hose at the subsea floor, a second collar connected by at least one guy to said anchor.

6. The invention of claim 1, wherein said anchor is a deadman on the sea floor.

7. The invention of claim 1, wherein said holding means comprise a set of articulated vertebrae extending from the anchor over a part of the length of the lower part of the hose, the hose being fastened buy a collar to said anchor.

8. The invention of claim 1, wherein said holding means comprises a hose guide affixed to the anchor, for holding and guiding, in the vertical plane, the corresponding part of the hose, said holding means further comprising a collar affixed to the anchor, the hose being secured within said collar.

9. The invention of claim 1, wherein said hose is continuous between the surface support and the subsea structure.

10. The invention of claim 1, wherein the intermediate element comprises a group of positive buoyancy elements fastened to the hose, spaced along its length.

* * * * *